(12) United States Patent
Huang et al.

(10) Patent No.: US 7,558,299 B2
(45) Date of Patent: Jul. 7, 2009

(54) SEMICONDUCTOR SATURABLE ABSORBER AND FABRICATION METHOD THEREOF

(76) Inventors: Kai-Feng Huang, EF353, Engineering Building VI, NO 1001, Ta Hsueh Rd, Hsinchu 300 (TW); Yung-Fu Chen, EF353, Engineering Building VI, NO 1001, Ta Hsueh Rd, Hsinchu 300 (TW)

( * ) Notice: Subject to any disclaimer, the term of this patent is extended or adjusted under 35 U.S.C. 154(b) by 11 days.

(21) Appl. No.: 11/971,401

(22) Filed: Jan. 9, 2008

(65) Prior Publication Data
US 2009/0080473 A1    Mar. 26, 2009

(30) Foreign Application Priority Data
Sep. 21, 2007  (TW) .............................. 96135552 A

(51) Int. Cl.
*H01S 3/113* (2006.01)
(52) U.S. Cl. .................................... 372/11; 372/45.013

(58) Field of Classification Search .................. 372/11
See application file for complete search history.

(56) References Cited

U.S. PATENT DOCUMENTS 5,265,107 A * 11/1993 Delfyett, Jr. ................. 372/11
5,666,373 A *  9/1997 Sharp et al. .................. 372/18

* cited by examiner

*Primary Examiner*—Dung T Nguyen
(74) *Attorney, Agent, or Firm*—Allen, Dyer, Doppelt, Milbrath & Gilchrist, P.A.

(57) ABSTRACT

A semiconductor saturable absorber and the fabrication method thereof are provided. The semiconductor saturable absorber includes a Fe-doped InP substrate, a periodic unit comprising an AlGaInAs QW formed on the Fe-doped InP substrate and an InAlAs barrier layer formed on one side of the AlGaInAs QW, and another InAlAs barrier layer formed on the other side of the AlGaInAs QW. Each of the InAlAs barrier layers has a width being a half-wavelength of a light emitted by the AlGaInAs QW.

7 Claims, 6 Drawing Sheets

SEMICONDUCTOR SATURABLE ABSORBER AND FABRICATION METHOD THEREOF

FIELD OF THE INVENTION

The present invention is related to a semiconductor saturable absorber and the fabrication method thereof, and more particularly to a semiconductor saturable absorber and the fabrication method used for a laser system.

BACKGROUND OF THE INVENTION

A laser system may be classified as a semiconductor laser, a solid-state laser, a gas laser, and a liquid laser according to a gain-medium used therefor, and a laser system essentially comprises a pumping system, a gain-medium and a resonator. When we want to get optical pulses in a laser system, a Q-switch is usually employed. The Q-switch is an active Q-switch or a passive Q-switch, wherein a saturable absorber can be used as the passive Q-switch resulting in a low cavity Q during the initial pumping of the gain medium. When the gain is sufficient to overcome the low intensity losses and the lasing begins, the saturable absorber is quickly "bleached" to a low-loss state and a giant pulse is generated.

Diode-pumped passively Q-switched solid-state lasers using saturable absorbers have attracted significant attention because of their compactness and simplicity in operation. Numerous saturable absorbers have been developed to replace the dyes used in solid-state lasers, such as $Cr^{4+}$-doped crystals and semiconductor saturable absorber mirrors (SESAMs). Nowadays, $Cr^{4+}$:YAG crystals are no doubt the most commonly used saturable absorbers, but it is quite inconvenient to apply $Cr^{4+}$:YAG crystals as saturable absorbers in conventional Nd-doped vanadate crystals because the absorption cross sections of $Cr^{4+}$:YAG crystals are not large enough for a good Q-switched criterion.

InGaAs/GaAs quantum wells (QWs) have been utilized as SESAMs; however, the lattice mismatch thereof leads to a limitation of a modulation depth that is defined as a maximum absorption change between low and high intensities. As a consequence, output pulse energies and conversion efficiencies with InGaAs SESAMs are generally significantly lower than those with $Cr^{4+}$:YAG crystals.

Therefore, it is highly desirable to develop a saturable absorber with a large absorption cross section, a large modulation depth, and a high damage threshold. In order to overcome the mentioned drawbacks in the prior art, a semiconductor saturable absorber and the fabrication method thereof are provided in the present invention.

SUMMARY OF THE INVENTION

In accordance with one aspect of the present invention, a semiconductor saturable absorber (SESA) is provided, which comprises a Fe-doped InP substrate, a periodic unit comprising an AlGaInAs quantum well (QW) formed on the Fe-doped InP substrate and an InAlAs barrier layer formed on one side of the AlGaInAs QW, and another InAlAs barrier layer formed on the other side of the AlGaInAs QW. Each of the InAlAs barrier layers has a width being a half-wavelength of a light emitted by the AlGaInAs QW.

Preferably, the SESA further comprises an antireflection layer coated on either one of both sides of the SESA. Furthermore, the saturable absorber is used for a laser system, especially for a Q-switched solid-state laser system.

Preferably, the SESA further comprises a first plurality of the periodic units sequentially formed on the Fe-doped InP substrate, and each periodic unit further comprises a second plurality of the AlGaInAs QWs, wherein the first plurality has an amount from 1 to 100 and the second plurality has an amount from 1 to 5.

Preferably, a first light wavelength of the AlGaInAs QW is in a range of 900 nm to 1700 nm, a second light wavelength of the InAlAs barrier layer is in a range of 806 nm to 1700 nm, and an energy gap of the AlGaInAs QW and the InAlAs barrier layer is not smaller than 50 meV.

In accordance with another aspect of the present invention, an SESA is provided, comprising an AlGaInAs layer having a QW-barrier structure formed on a substrate, wherein an energy gap of the QW-barrier structure is not smaller than 50 meV.

Preferably, the SESA further comprises an antireflection layer coated on either side of the SESA to reduce backreflections.

Preferably, the SESA further comprises a plurality of QW-barrier structures, wherein the plurality has an amount from 1 to 100, and each QW-barrier structure comprises a further plurality of QWs with the further plurality having an amount from 1 to 5. Furthermore, a first light wavelength of a light emitted by a QW of the QW-barrier structure is in a range of 900 nm to 1700 nm, a second light wavelength of a barrier layer of the QW-barrier structure is in a range of 800 nm to 1700 nm, and the barrier layer has a width being a half-wavelength of the light emitted by the QW and is formed on both sides of the QW.

Preferably, the QW-barrier structure is one of a lattice match structure and a strain structure, and the substrate is a Fe-doped InP substrate.

In accordance with a further aspect of the present invention, a method for manufacturing an SESA is provided, comprising the steps of: providing a substrate, forming an AlGaInAs layer with a QW-barrier structure on the substrate, and adjusting the composition of the QW-barrier structure, so an energy gap of the QW-barrier structure is not smaller than 50 meV.

Preferably, the method for manufacturing the SESA further comprises the steps of: polishing the substrate, and coating an antireflection layer on either side of the SESA. Furthermore, the substrate is preferably a Fe-doped InP substrate.

Preferably, the SESA further comprises a first plurality of the QW-barrier structures with the first plurality having an amount ranged from 1 to 100, and each of the QW-barrier structures comprises a second plurality of QWs with the second plurality having an amount ranged from 1 to 5. Furthermore, a first light wavelength of a light emitted by a QW of the QW-barrier structure is in a range of 900 nm to 1700 nm, and a second light wavelength of a light emitted by a barrier layer of the QW-barrier structure is in a range of 800 nm to 1700 nm.

Preferably, a barrier layer of the QW-barrier structure has a width being a half-wavelength of a light emitted by a QW of the QW-barrier structure, and is formed on both sides of the QW.

Preferably, the method for manufacturing the SESA further comprises a step of applying one selected from a group consisting of a compressive strain, a tensile strain and a compensative strain on the QW-barrier structure.

The present invention may best be understood through the following descriptions with reference to the accompanying drawings, wherein:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
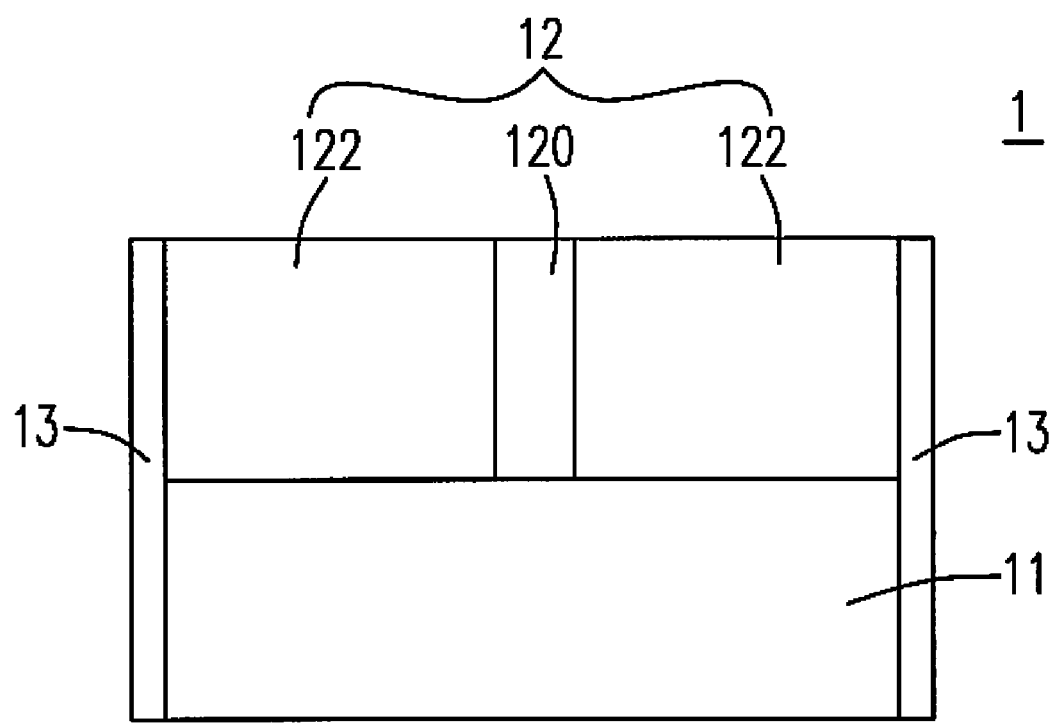
FIG. 1 is a diagram showing an SESA according to an embodiment of the present invention.

Please refer to FIG. 1, showing a semiconductor saturable absorber (SESA) according to an embodiment of the present invention. The SESA 1 comprises a substrate 11, and an AlGaInAs QW-barrier structure 12 formed on the substrate 11. The respective luminescence wavelengths of a QW 120 and a barrier layer 122 of the AlGaInAs QW-barrier structure 12 can be controlled by adjusting the composition of the AlGaInAs QW-barrier structure 12, wherein the light wavelength of the QW 120 of the QW-barrier structure 12 is in a range of 900 nm to 1700 nm, the light wavelength of the barrier layer 122 of the QW-barrier structure 12 is in a range of 800 nm to 1700 nm, and each of the barrier layers 122 has a width being a half-wavelength of the light emitted by the QW 120 and is formed on both sides of the QW 120. Furthermore, an energy gap ($\Delta E_c$) of the QW-barrier structure 12 is not smaller than 50 meV. In practice, the SESA 1 may comprise a plurality of QW-barrier structures 12, wherein the plurality has an amount from 1 to 100, and each QW-barrier structure 12 may comprise a further plurality of QWs 120 with the further plurality having an amount from 1 to 5.

Instead of a conventional S-doped InP substrate, the substrate 11 is a Fe-doped InP substrate according to the embodiment of the present invention because it is almost transparent for light wavelengths greater than 940 nm, and both sides of the SESA 1 are coated by antireflection layers 13 to reduce back-reflections. Furthermore, the QW-barrier structure 12 has a lattice match structure, but in practice the QW-barrier structure 12 may be applied with a compressive strain, a tensile strain, or a compensative strain to be a strain structure.

Please keep on referring to FIG. 1, wherein a method for manufacturing the SESA 1 is also provided by the present invention, comprising the steps of providing the substrate 11, forming the AlGaInAs layer 12 with the QW-barrier structure 120, 122 on the substrate 11 by a metalorganic chemical-vapor deposition method, and adjusting the composition of the QW-barrier structure 12, so the energy gap of the QW-barrier structure 12 is not smaller than 50 meV. Subsequently, the substrate 11 is mechanically polished and the antireflection layer 13 is coated on either side of the SESA 1.

Figure 2:
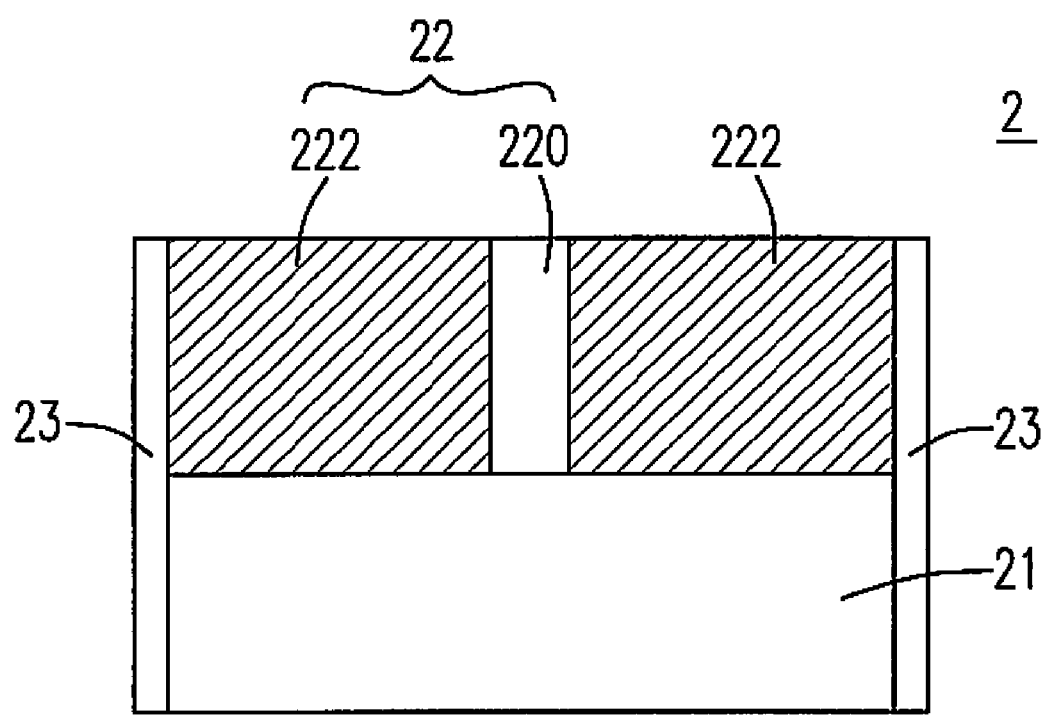
FIG. 2 is a diagram showing an SESA according to another embodiment of the present invention.

Please refer to FIG. 2, showing an SESA according to another embodiment of the present invention. The SESA 2 comprises a Fe-doped InP substrate 21, a periodic unit 22 comprising an AlGaInAs quantum well (QW) 220 formed on the Fe-doped InP substrate 21 and an InAlAs barrier layer 222 formed on one side of the AlGaInAs QW 220, and another InAlAs barrier layer 222 formed on the other side of the AlGaInAs QW 220, wherein each of the InAlAs barrier layers 222 has a width being a half-wavelength of a light emitted by the AlGaInAs QW 220. The luminescence wavelength of the AlGaInAs QW 220 is in a range of 900 nm to 1700 nm, and that of the InAlAs barrier layer 222 is in a range of 800 nm to 1700 nm. Furthermore, an energy gap of the AlGaInAs QW 220 and the InAlAs barrier layer 222 is not smaller than 50 meV.

In practice, the SESA 2 further comprises a plurality of the periodic units 22 sequentially formed on the Fe-doped InP substrate 21, and each of the periodic units 22 may further comprise a plurality of the AlGaInAs QWs 220 wherein the plurality has an amount from 1 to 5. Furthermore, the SESA 2 further comprises antireflection layers 23 coated on both sides thereof.

Figure 3:
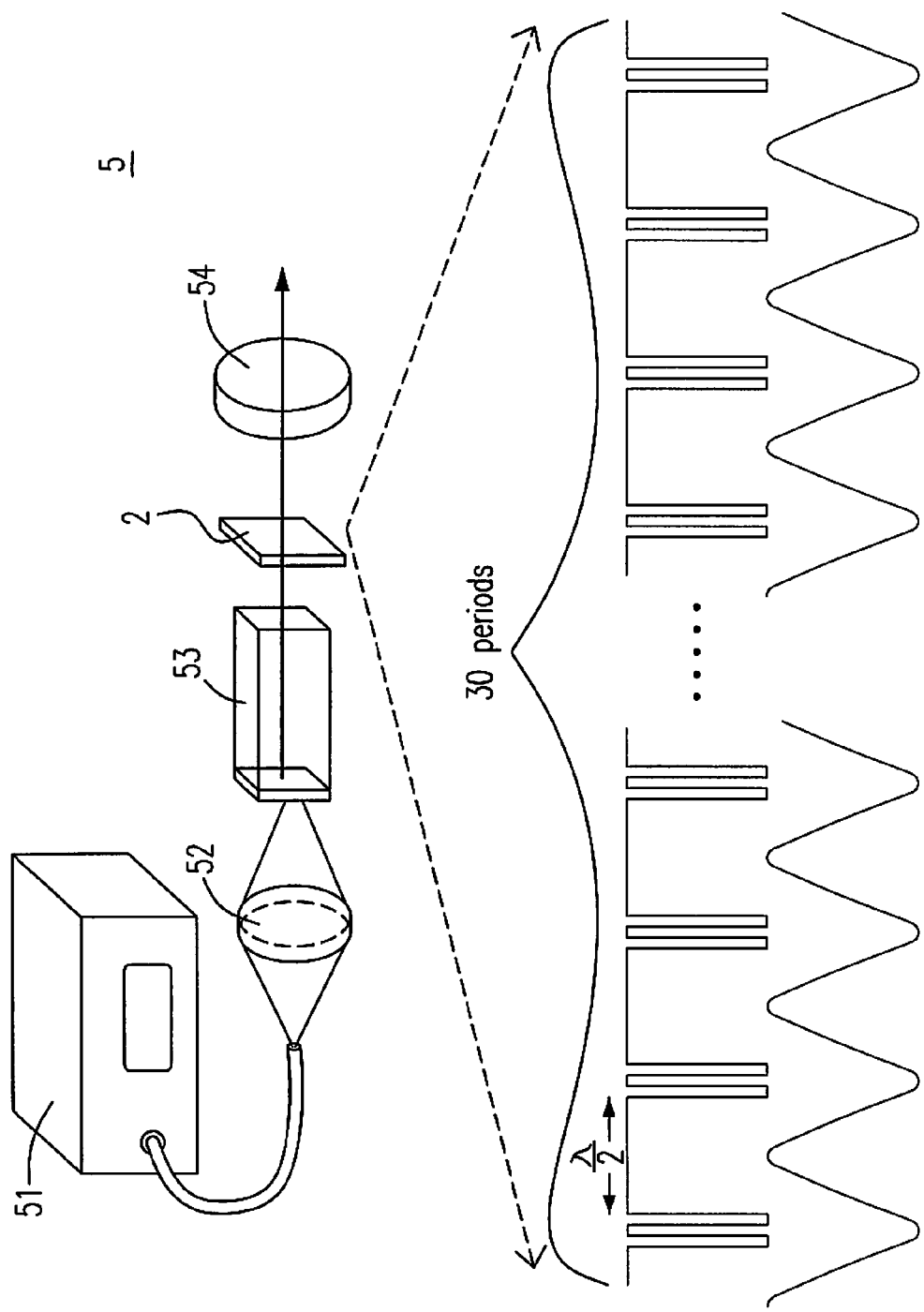
FIG. 3 is a diagram showing the SESA of the present invention being used in a laser system.

Please refer to FIG. 3, showing a passively Q-switched 1.06 μm Nd:YVO4 laser system 5 comprising a pumping system 51, focusing lens 52, a gain-medium 53, and an output coupler 54, and the SESA 2 is used as a saturable absorber therefor. The region of the SESA 2 comprises 30 groups of two QWs with the luminescence wavelength around 1060 nm and spaced at half-wavelength intervals by InAlAs barrier layers with the bandgap wavelength around 805 nm. Since the cavity modes with lower losses always dominate a lasing output, the lasing modes are naturally the modes with electric field minima along the periodic QWs. Therefore, the barrier layers are used not only to confine the carriers but also to locate the QW groups in the region of the nodes of the lasing standing wave. Since the total residual reflectivity of the antireflection-coated sample is approximately 5%, the SESA 2 coated with the antireflection layers 23 has to be aligned accurately in the tilt direction to recapture as much as possible of the reflected light in the cavity mode. The initial transmission of the SESA 2 at the wavelength of 1064 nm is measured to be approximately 70%. The modulation depth is experimentally found to be approximately 27% in a single pass with a z-scan method. Furthermore, the total nonsaturable loss introduced by the SESA 2 is found to be lower than 2%. From the numerical simulations of the SESA 2 design, the saturation fluence is estimated to be in the range of 1 mJ/cm2. The relaxation time of the SESA 2 is of the order of 100 ns.

The gain-medium 53 is a Nd:YVO$_4$ crystal being 6 mm long and doped with a 0.5% Nd$^{3+}$ concentration. One side of the Nd:YVO$_4$ is coated so as to be nominally highly reflecting at 1064 nm (R>99.8%) and antireflection coated at 809 nm (T>90%). The other side is antireflection coated at 1064 nm (R<0.2%). The pump system 51 is a 15 W 809 nm fiber-coupled laser diode with a core diameter of 800 μm and a numerical aperture of 0.16. The focusing lens 52 has a 16.5 mm focal length and 85% coupling efficiency, which is used to reimage a pump beam into the laser crystal. A pump spot radius is around 350 μm. The reflectivity of the output coupler 54 is 54% at 1064 nm. The overall Nd:YVO$_4$ laser cavity length is approximately 25 mm. The SESA 2 is positioned in the middle of the cavity to enable the lasing modes spontaneously to have their field nodes near the QWs.

Figure 4A:
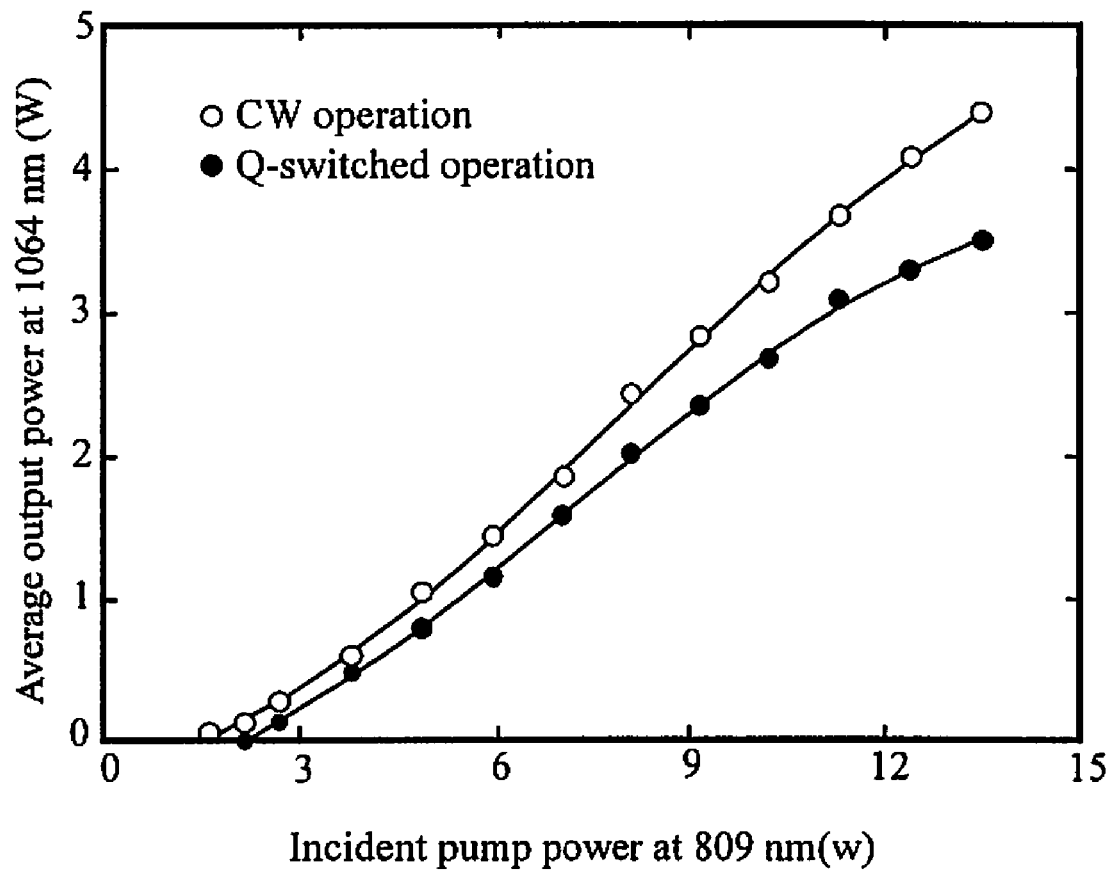
FIG. 4(A) is an experimental diagram showing an average output power versus an incident pump power in cw and passively Q-switching operations.

Please refer to FIG. 4(A), showing an average output power at 1064 nm with respect to an incident pump power respectively in cw and passively Q-switching operations. The cw performance at 1064 nm provides the baseline for evaluating the passively Q-switched efficiency. Without the SESA 2 in the cavity, the cw laser at 1064 nm has an output power of 4.4 W at an incident pump power of 13.5 W. In the passively Q-switching regime, i.e. with the SESA 2 in the cavity, an average output power of 3.5 W is obtained at the incident pump power of 13.5 W. Therefore, the Q-switching efficiency (the ratio of the Q-switched output power to the cw power at the maximum pump power) is found to be close to 80%, and this Q-switching efficiency is considerably better than the results obtained with an InGaAs SESAM.

Figure 4B:
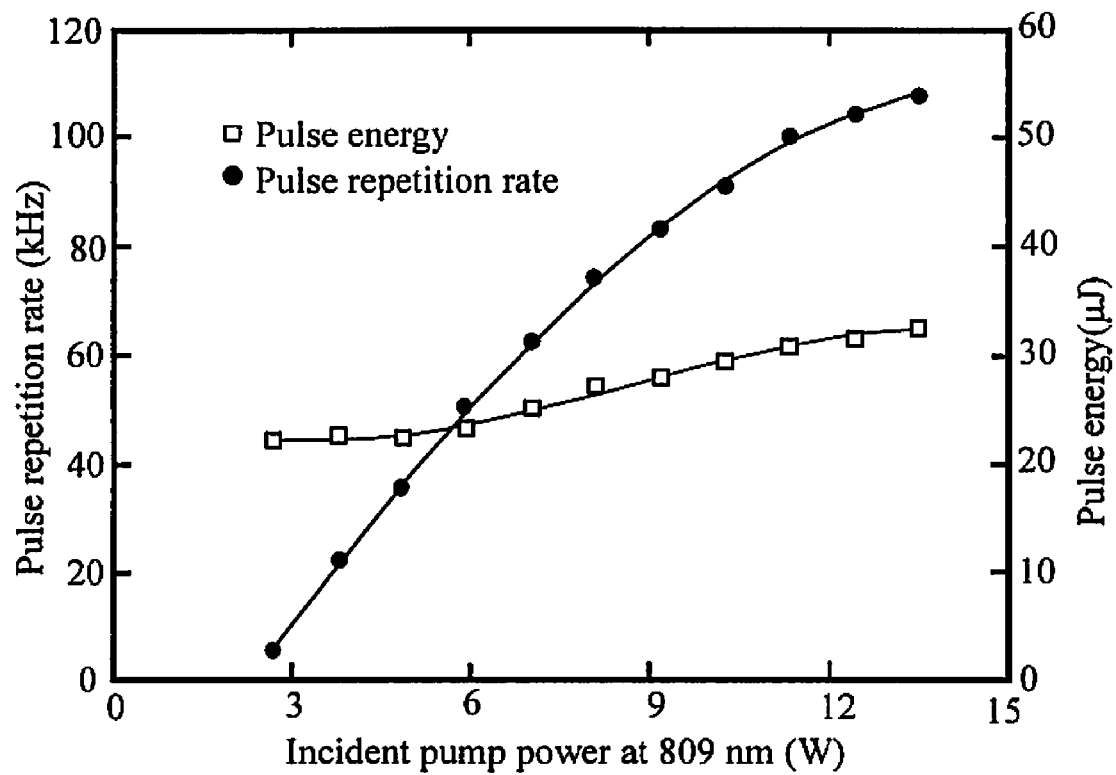
FIG. 4(B) is an experimental diagram showing a pulse repetition rate and a pulse energy versus the incident pump power.

Please refer to FIG. 4(B), which is an experimental diagram showing a pulse repetition rate and a pulse energy versus the incident pump power. The pulse temporal behavior is recorded by a LeCroy digital oscilloscope (Wavepro 7100, 10 Gsamples/s, 1 GHz bandwidth) with a fast p-i-n photodiode. The pulse repetition rate increases monotonically up to 110 kHz with the pump power. On the other hand, the pulse energy increases with the incident pump power little by little, from 22 µJ at the threshold of 3 W to 33 µJ at the incident pump power of 13.5 W. The increasing of the pulse energy with increased pump power may come from the thermal effects that induce changes of the mode sizes on the gain medium 53 and the SESA 2.

Figure 4C:
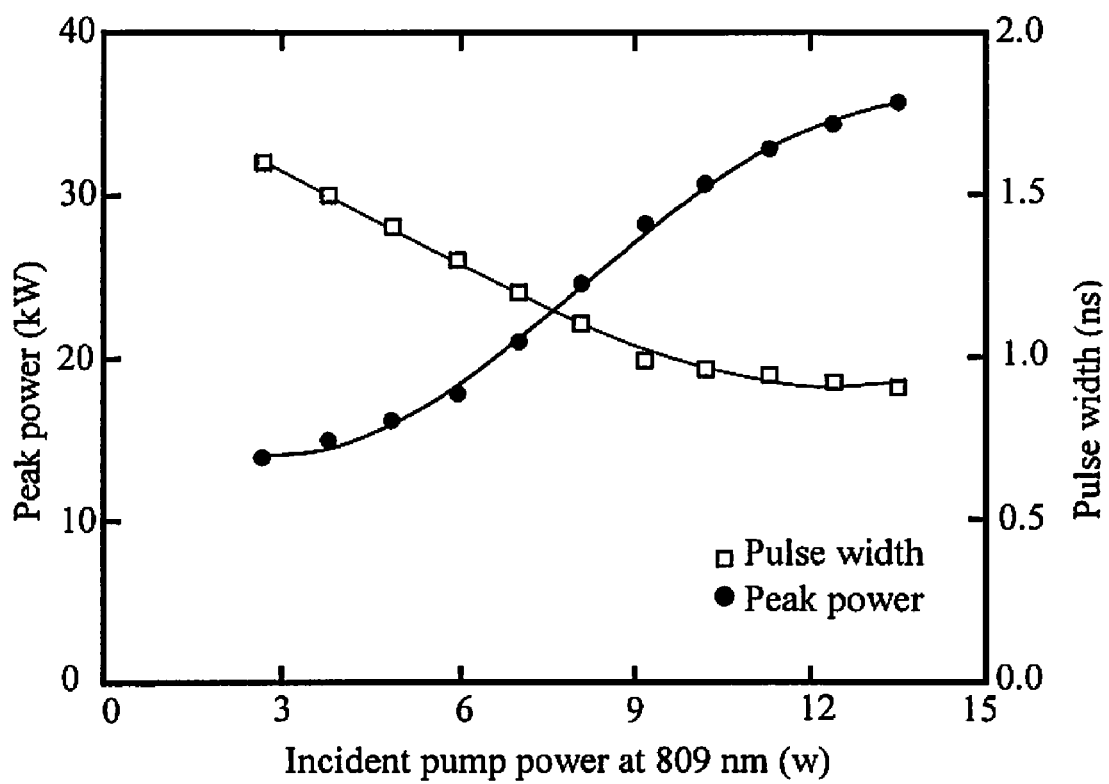
FIG. 4(C) is an experimental diagram showing a peak power and a pulse width (FWHM) as a function of the incident pump power.

Please refer to FIG. 4(C), which is an experimental diagram showing a peak power and a pulse width (FWHM) as a function of the incident pump power. As shown in FIG. 4(C), the pulse width decreases rather slowly from 1.6 ns at the threshold of 3 W to 0.9 ns at the incident pump power of 13.5 W. As a consequence, the peak power of the passively Q-switched Nd:YVO$_4$ laser system 5 increases from 14 kW at the threshold of 3 W to 36 kW at the incident pump power of 13.5 W. The overall performance can parallel the results obtained with Cr$^{4+}$:YAG crystals as a saturable absorber.

In sum, the experimentally remarkable performance confirms the prospect of using an AlGaInAs saturable absorber with a periodic QW/barrier structure as a saturable absorber in a solid-state laser system. Accordingly, the present invention provides a novel and creative semiconductor saturable absorber which achieves an efficient high-peak-power and high-average-power passively Q-switched laser system. Furthermore, damage to an absorber can be ingeniously avoided by the periodic QW/barrier structure of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A semiconductor saturable absorber, comprising:
   a Fe-doped InP substrate;
   a periodic unit comprising:
      an AlGaInAs quantum well (QW) formed on the Fe-doped InP substrate; and
      an InAlAs barrier layer having a width being a half-wavelength of a light emitted by the AlGaInAs QW, and formed on one side of the AlGaInAs QW; and
   another InAlAs barrier layer formed on the other side of the AlGaInAs QW.

2. A semiconductor saturable absorber according to claim 1 further comprising an antireflection layer coated on either one of both sides of the semiconductor saturable absorber.

3. A semiconductor saturable absorber according to claim 1, further comprising:
   a plurality of the periodic units sequentially formed on the Fe-doped InP substrate.

4. A semiconductor saturable absorber according to claim 1, wherein the periodic unit further comprises a plurality of the AlGaInAs QWs and the plurality has an amount from 1 to 5.

5. A semiconductor saturable absorber according to claim 1, wherein a first light wavelength of the AlGaInAs QW is in a range of 900 nm to 1700 nm, and a second light wavelength of the InAlAs barrier layer is in a range of 800 nm to 1700 nm.

6. A semiconductor saturable absorber according to claim 1, wherein an energy gap of the AlGaInAs QW and the InAlAs barrier layer is not smaller than 50 meV.

7. A semiconductor saturable absorber according to claim 1, being used for a laser system.

* * * * *